United States Patent [19]

Lyke

[11] Patent Number: 5,084,264

[45] Date of Patent: Jan. 28, 1992

[54] PROCESS FOR OXIDATION OF HYDROGEN HALIDES TO ELEMENTAL HALOGENS

[75] Inventor: Stephen E. Lyke, Middleton, Wis.

[73] Assignee: Battelle Memorial Institute, Richland, Wash.

[21] Appl. No.: 449,613

[22] Filed: Dec. 12, 1989

[51] Int. Cl.$^5$ .............................................. C01B 7/04
[52] U.S. Cl. ................................. 423/502; 423/504; 423/507
[58] Field of Search ............... 423/502, 503, 504, 507, 423/DIG. 12

[56] References Cited

U.S. PATENT DOCUMENTS

| | | | |
|---|---|---|---|
| 2,381,908 | 8/1945 | Hurt et al. | 423/506 |
| 2,448,255 | 8/1948 | De Benedictis et al. | 364/828 |
| 3,816,599 | 6/1974 | Kafes | 423/488 |
| 4,107,280 | 8/1978 | Rohrmann | 423/502 |
| 4,269,817 | 5/1981 | Kohrmann | 423/502 |
| 4,537,835 | 8/1985 | Rohrmann et al. | 423/502 |

FOREIGN PATENT DOCUMENTS

| | | | |
|---|---|---|---|
| 1240830 | 5/1967 | Fed. Rep. of Germany | |
| 124190 | 10/1978 | Japan | 423/502 |

OTHER PUBLICATIONS

Glueck, A. R. et al; The Kinetics of the Oxidation of Sulphur Dioxide Over Molten Salts, Chemical Engineering Science, 1968, vol. 23, pp. 1257-1265.
Nonnenmacher et al., Chem. Abst, vol. 67, 1967, No. 55682n, "The Preparation of Chlorine from Hydrogen Chloride".

Primary Examiner—Gary P. Straub
Assistant Examiner—Brian M. Bolam

[57] ABSTRACT

An improved process for generating an elemental halogen selected from chlorine, bromine or iodine, from a corresponding hydrogen halide by absorbing a molten salt mixture, which includes sulfur, alkali metals and oxygen with a sulfur to metal molar ratio between 0.9 and 1.1 and includes a dissolved oxygen compound capable of reacting with hydrogen halide to produce elemental halogen, into a porous, relatively inert substrate to produce a substrate-supported salt mixture. Thereafter, the substrate-supported salt mixture is contacted (stage 1) with a hydrogen halide while maintaining the substrate-supported salt mixture during the contacting at an elevated temperature sufficient to sustain a reaction between the oxygen compound and the hydrogen halide to produce a gaseous elemental halogen product. This is followed by purging the substrate-supported salt mixture with steam (stage 2) thereby recovering any unreacted hydrogen halide and additional elemental halogen for recycle to stage 1. The dissolved oxygen compound is regenerated in a high temperature (stage 3) and an optical intermediate temperature stage (stage 4) by contacting the substrate-supported salt mixture with a gas containing oxygen whereby the dissolved oxygen compound in the substrate-supported salt mixture is regenerated by being oxidized to a higher valence state.

20 Claims, 2 Drawing Sheets

PROCESS FOR OXIDATION OF HYDROGEN HALIDES TO ELEMENTAL HALOGENS

FIELD OF THE INVENTION

This invention relates to the regeneration of elemental halogens from hydrogen halides and/or hydrohalic acids and more specifically to the use of a molten salt to catalytically oxidize hydrogen chloride to produce chlorine.

In the production of organic chlorides for use in plastics and other products, large amounts of hydrochloric acid are frequently produced as a by-product or waste. This excess hydrochloric acid is traditionally either utilized productively, if possible, or neutralized with limestone and discharged to the environment as an aqueous waste. Due to the increasing restrictions on the discharge of pollutants and the rising cost of chlorine, it has become more attractive to provide a method for regenerating chlorine from the by-product hydrochloric acid. Previous methods for regenerating chlorine from hydrochloric acid have, however, met with engineering and economic problems which prevented their implementation on a large scale.

It is presently known that hydrogen chloride, for example, may be oxidized with sulfur trioxide to produce a mixture of chlorine and sulfur dioxide. This process requires a series of at least three separate process steps to obtain the mixture from which the chlorine must be subsequently separated.

Another prior method is the oxidation of hydrochloric acid with sulfur dioxide and oxygen in the presence of a bed of metal oxide catalysts to produce sulfuric acid and chlorine. The solid supported catalysts used in such systems are difficult to prepare and tend to deactivate or degrade rapidly.

Oxygen is also being used to oxidize hydrogen chloride in the presence of an oxide of nitrogen catalyst and an excess of sulfuric acid having a concentration of at least 65 percent. This process is complicated and expensive because it requires numerous process steps.

Hydrochloric acid has also been oxidized with oxygen in molten inorganic chlorides and an olefin chlorine acceptor such as ethylene. Such systems must accommodate complex chemical reactions which produce a variety of different reaction products. Also, because inorganic chlorides tend to volatilize in the reaction zone, the catalyst is driven off and separation of chlorine from the reactor effluent is difficult. Furthermore, operation with chloride salts is corrosive to process equipment.

In addition, hydrochloric acid has been regenerated by means of electrolytic processes which are expensive and which require substantial electrical energy consumption.

DESCRIPTION OF RELATED ART

U.S. Pat. Nos. 4,537,835, Rohrmann and Fullam and 4,107,280, Rohrmann, teach oxidation of hydrogen halides (HX) to elemental halogens ($X_2$) with catalytic molten salt mixtures. U.S. Pat. No. 4,269,817, Rohrmann, teaches the production of elemental chlorine from chloride salts.

U.S. Pat. Nos. 4,107,280 and 4,269,817 involve contacting HX with a circulating molten salt containing a dissolved oxygen compound to produce $X_2$ and water ($H_2O$) and regenerating the molten salt by contact with a separate gas stream which can be oxygen or air. This method has been found to have some drawbacks in practice. One is that some of the halide dissolves in the salt during the HX contact step. Dissolved halide reduces the yield of $X_2$ and evolves from the salt as HX and $X_2$ during the air contact step. Also, the regeneration reaction is slower than would be commercially desirable. Further, the processes rely on transporting molten salt which is corrosive to pumps and piping networks.

U.S. Pat. No. 4,537,835 discloses the regeneration of halogen from a waste or by-product hydrohalic gas without salt circulation. The by-product gas is mixed with oxygen or air and then contacted with a catalytically active molten salt in a suitable contactor which contains only liquids and gases. Salt circulation is eliminated at the expense of separating nitrogen from oxygen feed or halogen product. The opportunity to carry out the oxygen regeneration reaction at a different temperature than the HX oxidation is sacrificed. Free liquid salt must still be contacted with gas so that containment and entrainment problems remain.

In all three patents, the disclosed salt is comprised chiefly of alkali metal pyrosulfates and normal sulfates with a lesser amount of vanadium pentoxide which serves as an oxidation catalyst. In the first two patents the vanadium also serves as an oxygen carrier.

A method for regenerating halogens from hydrogen halides which does not require molten salt circulation or handling free liquid salt would be an advance in the art. A method of reducing solubility and of stripping or recovering the halide that does dissolve in the salt would be advantageous. A method of increasing the amount of halogen, such as chlorine, recovered while increasing the rate of the regeneration reaction would make the catalytic molten salt oxidation process commercially attractive. It is an object of the present invention to disclose an improved method enabling increased recovery and yield of halogens and faster regeneration of the catalytic salt. It is an object of the present invention to disclose a process for oxidizing HX to $X_2$, wherein X is a halide, which does not require molten salt circulation.

SUMMARY OF THE INVENTION

Figure 1:
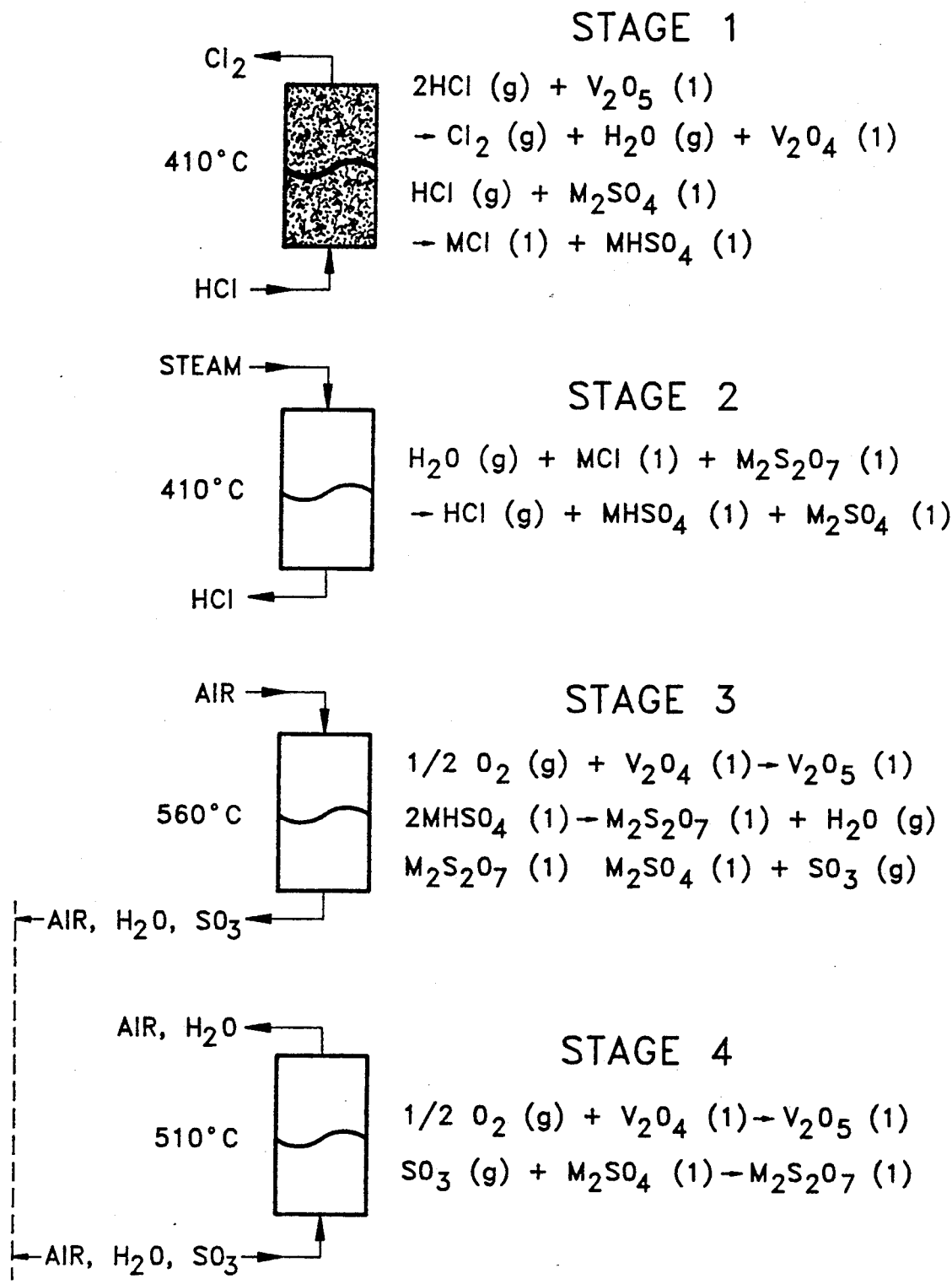
FIG. 1 depicts the typical four stages of a contactor according to the invention.

The catalytic molten salt HX oxidation method involves contacting HX with a molten salt containing a dissolved oxygen compound to produce $X_2$ and water and regenerating the molten salt by contact with a separate gas stream which can be air. Prior art processes circulated the molten salt. Circulation of strong oxidants was severe on equipment. This often resulted in system breakdowns attributable to corrosion in piping networks.

The present invention is a process for generating an elemental halogen selected from chlorine, bromine or iodine, from a corresponding hydrogen halide comprising absorbing a molten salt mixture, which includes sulfur, alkali metals and oxygen with a sulfur to metal molar ratio between 0.9 and 1.1 and includes a dissolved oxygen compound capable of reacting with hydrogen halide to produce elemental halogen, into a porous, relatively inert substrate to produce a substrate-supported salt mixture. Thereafter, the substrate-supported salt mixture is contacted (stage 1) with a hydrogen halide in the substantial absence of an oxygen bearing gas while maintaining the substrate-supported salt mixture during said contacting at an elevated temperature sufficient to sustain a reaction between said oxygen compound and said hydrogen halide to produce a gaseous elemental halogen effluent, substantially free of gaseous oxygen. This is followed by purging the substrate-supported salt mixture with steam (stage 2) thereby recovering any unreacted hydrogen halide and elemental halogen. The dissolved oxygen compound is regenerated in a high temperature (stage 3) and an intermediate temperature stage (stage 4) by contacting the substrate-supported salt mixture with a gas containing oxygen whereby the dissolved oxygen compound in the substrate-supported salt mixture is regenerated by being oxidized to a higher valence state. The high temperature stage also removes $SO_3$. A lower $SO_3$ concentration may speed the regeneration step. $SO_3$ is returned to the salt during the intermediate temperature regeneration stage. Then stages 1, 2, 3, and 4 are repeated.

The present invention is an improved process for the oxidation of hydrogen halides (HX) to elemental halogens ($X_2$) having increased yield and eliminating molten salt transfer. In the invention molten salt is supported by inert solids rather than circulated. The improvements of the invention additionally involve appreciably raising the sulfur content of the salt to reduce solubility of HX in the supported salt. Additionally a steam strip is used to recover HX that does dissolve for recycle directly to the HX oxidation stage. $SO_3$ is stripped from the salt in the first air contact stage which is operated at elevated temperature to accelerate the regeneration reaction. The stripped $SO_3$ is recovered by absorption in the regenerated salt in the final stage. The invention eliminates the necessity for molten salt transport by relying on gas transfer rather than molten salt transfer.

The invention discloses raising the sulfur content of the molten salt by 5 to 10 percent. Surprisingly, this increase in the sulfur content of the supported molten salt increases the efficiency of chloride recovery by steam stripping by a factor of 4 times.

In the invention, hydrogen halide gas produced from a waste or byproduct hydrohalic acid is contacted with catalytically active molten salt in a suitable salt contactor. The salt is comprised chiefly of alkali metal pyrosulfates and sulfates with a lesser amount of vanadium pentoxide which serves as a source of oxygen for reaction with the hydrogen halide. The salt is supported by an inert solid such as a porous ceramic. The gaseous effluent stream which leaves the contactor contains the halogen plus some steam and unreacted hydrogen halide, but no free oxygen. The halogen is easily separated from the steam and hydrogen halide which is recycled. The spent salt contactor is then contacted with an oxygen-bearing gas to regenerate the dissolved vanadium to its active, higher valence state.

DETAILED DESCRIPTION OF THE INVENTION

The present invention is an improved process for the oxidation of hydrogen halides (HX) to elemental halogens ($X_2$). Referring to FIG. 1, the general process of the present invention for regenerating either chlorine, bromine or iodine from their respective halides is shown. A waste or by-product hydrogen halide gas is fed in stage 1 to a fused salt contactor containing molten alkali pyrosulfate immobilized in a porous ceramic-like material. In pilot studies, UCI 65968 Silica carrier was used; having a porosity of 55.7 percent and a 5.3 micron mean pore diameter. Other suitable support materials could be selected such as (but not limited to) Norton SA5218 ceramic carrier, 37 to 42 percent porosity, 75 micron mean pore diameter, or Norton SA5121 ceramic carrier, 38 to 52 percent porosity, 25 micron mean pore diameter. The UCI material in the form of ¼ inch rings was used in the pilot studies since it displayed the highest weight gain in terms of molten salt absorbed. The contactor contains a molten salt mixture including a dissolved oxygen compound of vanadium and a molar ratio of sulfur to alkali metal of at least 0.9. When exposed to this contactor in stage 1, the hydrogen halide is oxidized by reaction with the vanadium compound according to the following general reaction:

$$2HX + V_2O_5 \rightarrow V_2O_4 + X_2 + H_2O \qquad (1)$$

where X=Cl, Br or I. In a pilot test with hydrogen chloride, close to 100 percent conversion to chlorine was obtained. Any unreacted halide could be easily separated for recycle.

The added sulfur (in the form of pyrosulfates or sulfuric acid) to the immobilized molten salt in the inert support material inhibits absorption of HX into the fused salt, apparently by shifting the following reactions to the right:

$$M_2S_2O_7 + H_2O = 2MHSO_4 \qquad (1A)$$

$$H_2SO_4 + M_2SO_4 = 2MHSO_4 \qquad (1B)$$

$$MX + MHSO_4 = M_2SO_4 + HX \qquad (1C)$$

where M is a metal. Nevertheless, some halide still dissolves. For this reason in stage 2 the salt contactor is purged with steam. The effluent gas leaving the contactor in stage 2 contains a mixture of hydrogen halide gas, elemental halogen gas and some unreacted steam suitable for recycle to stage 1. In pilot tests most of the reaction product water and purge steam were recovered during regeneration (steps 3 and 4). Low steam concentration in the recovered HX, $X_2$ is advantageous (also consistent with available data on solubility of steam in the salt).

In stage 1 contact with the hydrogen halide gas causes the vanadium in the molten salt mixture to be reduced to a lower valence state. The vanadium must be regenerated before the immobilized salt mixture can be reused. In the past, this regeneration was accomplished by transporting the spent salt mixture to a second fused salt contactor. This gave rise to many problems-including corrosion of pipe networks. This invention eliminates molten salt transport. In this invention, the reduced salt mixture following steam purging is contacted with a stream of oxygen-bearing gas such as air in stage 3, preferably, directed in reverse flow through the molten salt mixture absorbed in the substrate material such as porous ceramic, or porous ceramic pellets. By selective routing of feedstreams the pellets containing reduced vanadium can be contacted with an oxygen bearing gas to regenerate the vanadium catalyst and then recontacted with the HX feedstream to regenerate $X_2$. Transporting gases using regulatory valves would have fewer corrosion problems and overall be more attractive commercially than systems based on liquid or solids transport. Temperature differences between stages can be realized by heat exchange with gas streams. The vanadium reacts with oxygen in the oxygen bearing gas and is regenerated to its higher valence state. The regenerated salt is then recontacted with hydrogen halide gas.

Waste or by-product hydrohalic acid can be passed into a hydrohalic acid dehydrator. If waste or by-product hydrogen halide is substantially free of water, it can be fed directly into a stage 1 contactor ready to accept HX for the conversion to $X_2$ without passing through the dehydrator. In stage 1 of FIG. 1 hydrogen halide passes into a fused salt contactor, wherein the hydrogen halide gas is contacted with an immobilized molten salt mixture including $V_2O_5$ which oxidizes the hydrogen halide according to the general reaction:

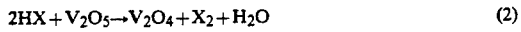

$$2HX + V_2O_5 \rightarrow V_2O_4 + X_2 + H_2O \qquad (2)$$

Here the fourth and fifth oxidation states of vanadium are by the well known solid compounds $V_2O_4$ and $V_2O_5$, respectively. Those skilled in the art will recognize that a variety of species may be present in solution comprising vanadium in these oxidation states, for example, in oxo sulfato complexes (see Hansen, Fehrmann and Bjerrum, *Inorg. Chem.* 1982, 21, pp. 744–752).

Figure 2:
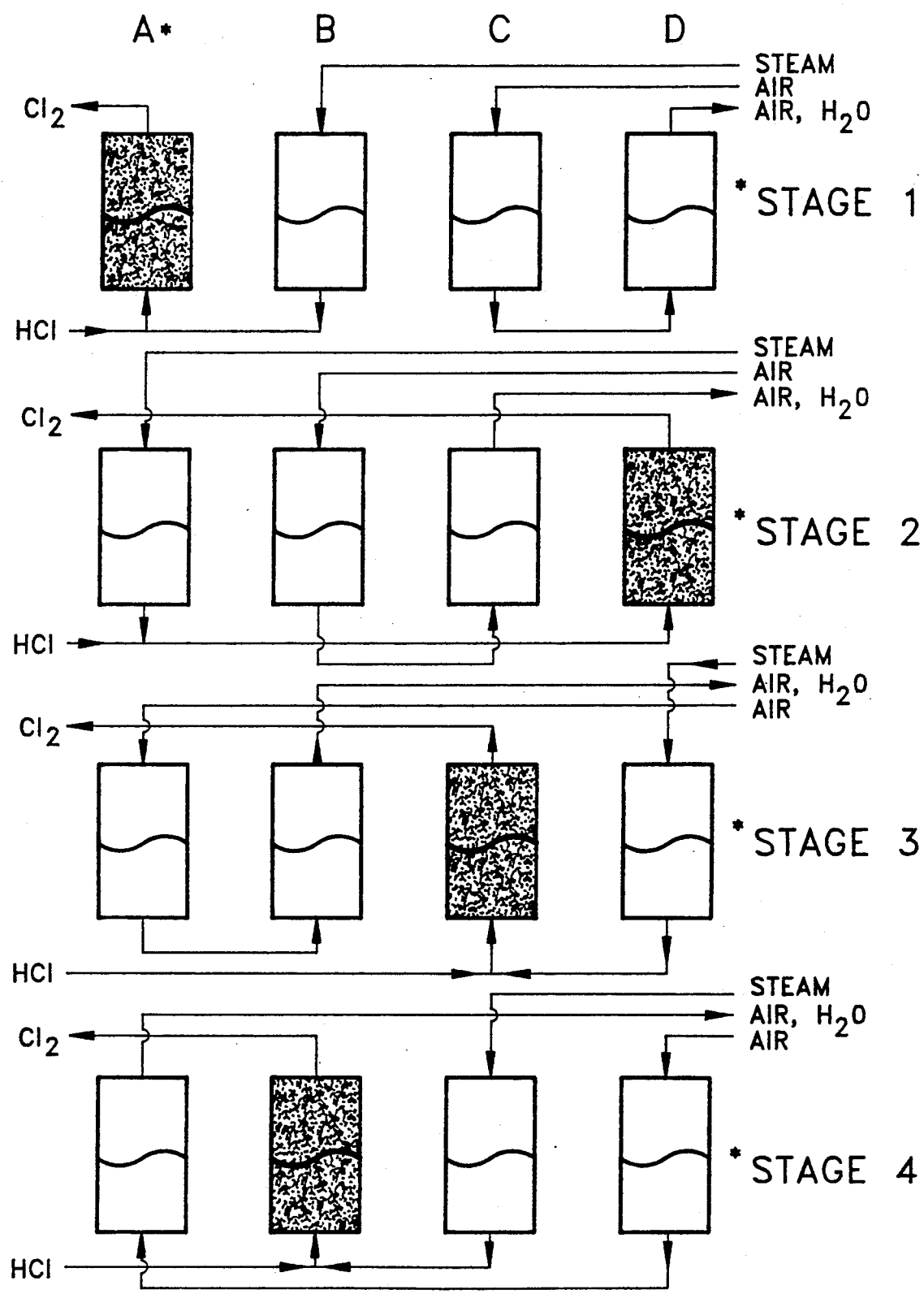
FIG. 2 depicts four stages with four contactors illustrating an interconnected continuous system.

Advantageously the temperature in stage 1 is close to 410° C. In stage 2 steam is routed to the contactor thereby recovering HX and $X_2$ from the salt. In stage 2 of FIG. 1 the gas leaving the contactor contains some water vapor and chlorine along with residual hydrogen chloride, but substantially no free oxygen. The hydrogen chloride and a majority of the water vapor in the effluent gas stream may be removed by means of a condenser or preferably recycled to stage 1 as illustrated in FIG. 2. Stage 2 can also be operated at 410° C.

Because the valence state of the vanadium in the salt mixture is reduced when the hydrogen chloride is oxidized in the fused salt contactor according to reaction (2), it is necessary to regenerate the vanadium to its higher valence state. Such regeneration is accomplished by contacting the molten salt in stage 3 with an oxygen-bearing gas. The vanadium is thereby oxidized to regenerate the $V_2O_5$ according to the following general reaction:

$$V_2O_4 + 1/2 O_2 \rightarrow V_2O_5 \qquad (3)$$

An elevated temperature may be used in stage 3 to accelerate the regeneration reaction. Use of temperatures over 530° C. would strip significant quantities of $SO_3$ from the salt. Reduced $SO_3$ content may further accelerate the regeneration reaction. An advantageous temperature for stage 3 would be 560° C. Stage 4 is added to return $SO_3$ to the salt by contacting it with the effluent from stage 3 after cooling to an intermediate temperature, such as 510° C., where $SO_3$ but not $H_2O$ will be reabsorbed.

The regenerated molten salt, which now includes vanadium in its high valence state, can be reused as the salt contactor for HX.

Air is the preferred oxygen-bearing regeneration gas due to its ready availability and low cost. The air is circulated through the salt contactor and can then be vented directly to the atmosphere. Oxygen is another suitable gas. It is used most efficiently if the unreacted fraction of the oxygen leaving the contactor is returned to the inlet line leading to the contactor with reduced vanadium salt.

The ratio of hydrogen halide feed to molten salt during stage 1 has an effect on the overall efficiency of the system. The preferred ratio will depend on the salt composition and operating temperature, but may be easily determined by experimentation. Similarly the amount of steam used in stage 2 must be chosen for maximum halide recovery with minimum carry-over of steam. Ideally, all of the reaction product and stage 2 steam will remain in the salt as bisulfate (see FIG. 1).

Though it is important that the water content of the gas in the contactor in stage 1 of FIG. 1 be low because excess water introduced to the salt immobilized in the contactor will drive the reaction of equation (2) to the left and thus impede the formation of elemental halogen, small amounts of water are tolerable. However, large quantities of water can impede halogen formation such that it can be severely diminished. To obtain the most economical operation, the expense of feedstock dehydration should be weighted against the amount and value of elemental halogen regenerated to determine the preferred water content for the feedstock stream.

The salt composition suitable for use according to the present invention includes alkali metal sulfates, alkali metal pyrosulfates and a dissolved oxygen compound which is capable of reacting with the hydrogen chloride to produce elemental chlorine. $V_2O_5$ is an exceptionally active oxygen compound which may be included in the salt mixture to the extent that it will dissolve in the melt. Preferably, $V_2O_5$ comprises between 2 and 25 weight percent of the salt mixture and more preferably between 13 and 18 weight percent.

Other soluble metal oxides may be used for the oxidation of hydrogen halides according to the process of the present invention. These include soluble oxides of copper, iron, chromium or manganese. Less suitable are oxides of lead, nickel, cobalt or uranium.

U.S. Pat. No. 4,107,280 teaches that a variety of different alkali metal sulfates and pyrosulfates may be chosen to make up the fused salt mixture. Sulfates and pyrosulfates of potassium and sodium are preferred due to their abundance and favorable characteristics. It has been found that halogen production can be significantly increased if the pyrosulfate concentration of the salt is increased 5 to 10 percent above the concentrations taught useful in the prior art. A molar ratio of sulfur to alkali metal between 0.9 and 1.1 is desirable. Thus in this invention a sulfate concentration of from 0 to substantially 10 percent by weight is preferred.

The materials added to increase the pyrosulfate concentration of the salt can be selected from alkali metal pyrosulfates including pyrosulfates of potassium, lithium, sodium or can be derived from a metal-free source such as direct addition of sulfuric acid.

A mixture containing 3 to 8 weight percent of alkali metal sulfates and 50 to 90 weight percent or preferably 77 to 82 weight percent pyrosulfates appears optimum when the preferred 13 to 18 weight percent of $V_2O_5$ is used. Small amounts of any other soluble sulfate or pyrosulfate can be added to such a mixture of compounds without greatly reducing the effectiveness of the salt mixture. The alkali metals can comprise any combination of potassium and sodium although the low-melting mixture comprising a potassium/sodium ratio of ⅓ to 1/5 is preferred. In addition, the inclusion of small amounts of lithium sulfate, or sulfuric acid have been found to have desirable effect on the freezing temperature, corrosivity, SO₃ vapor pressure, viscosity, and operating temperature range of the salt mixture as well as improving the amount of halogen produced. The combined amounts of these substances in the salt mixture should not substantially exceed 10 weight percent. Additions beyond this amount are found to be either undesirable or unfeasible.

When this preferred salt mixture is used, hydrogen chloride may be oxidized when the salt is maintained in the temperature range of 275° C. to 580° C. The best results are achieved in the temperature range of about 400° C. to 475° C. Operating temperatures used in the second contacting stage may conveniently be similar to those of the first.

Assuming conservatively, that an 80 percent approach to equilibrium is achieved in each of the four stages when substantially dry hydrogen chloride gas is the feedstock, the effluent gas leaving the stage 1 contactor would contain in volume about:
79% $Cl_2$
5% $H_2O$
16% HCl By employing a series of contactors with immobilized salt and with each contactor at a different oxidation state, a continuous process can be fashioned according to the invention which only relies on gas transport rather than transport of molten salt. FIG. 2 more specifically illustrates this concept.

Preferably at least four contactors and four stages can be involved in the process to achieve the maximum efficiency in the utilization of feedstreams and by-product streams. The four stages of the process are as follows:

Stage 1

Routing HCl at 275° C. to 580° C. (preferably 400° C. to 475° C.) to a contactor containing molten salt immobilized in a ceramic support material. The molten salt contains oxidized vanadium. Chlorine gas exits the contactor.

Stage 2

Routing steam to the contactor of stage 1 but from the reverse direction such that a reverse flush is effected. The steam is at 275° C. to 580° C. (preferably 400° C. to 475° C.). HCl exits the contactor.

Stage 3

Routing air to the contactor from the same reverse direction as the steam was introduced. The air is at 430° C. to 580° C. and preferably 530°–570° C. if a fourth stage is used. The air oxidizes the reduced vanadium back to the oxidized form but strips some $SO_3$.

Stage 4

Routing the air and steam effluent from stage 3 to the contactor from the forward direction at 430° C. to 530° C. and preferably 470° C. to 510° C. to complete oxidation of the vanadium and to return the $SO_3$ stripped from the salt.

In FIG. 2, the reactions in the contactor in Column A correspond exactly to the reaction stages. Stages 1 to 4 are illustrated in FIG. 1. The contactors in Columns B, C, and D also operate in four stages but would be incrementally at different stages of the process as illustrated in FIG. 2.

Although the invention herein has been described with reference to three or four stages through which an equal number of fixed bed reactors progress as different temperatures and contacting gases are applied, further embodiments of the invention provide for circulation of liquid salt between three or four countercurrent reactors with functions analogous to the stages outlined herein. These alternate embodiments have the advantage of providing a continuous process, free of variations that may result from stage changes, but return to the less advantageous circulation of corrosive molten salt. The advantages involving improved yield and regeneration rate relative to the prior art are substantially preserved in these alternate embodiments.

EXAMPLE

A series of experiments was performed to test some of the concepts in the current invention. Porous silica pellets (132 g of UCI 65968) were loaded with a molten salt mixture (158 g). The melt was prepared from vanadium pentoxide, sodium acid sulfate monohydrate and potassium pyrosulfate so that the initial sulfur to alkali metal weight ratio was 1.0; however, the mixture lost moisture and sulfur trioxide during fusion and application to the support so that the components V/S/Na/K were present in the estimated molar ratios 0.25/0.9/0.82/0.18 at the beginning of the HCl oxidation experiments. The finished pellets, containing about 155 millimoles of vanadium pentoxide, could be cooled and handled as dry, free flowing solid particles (¼" rings).

The pellets were loaded into a 30 mm, quartz, tubular reactor which was situated in a furnace and connected to a gas metering and analysis system. Hydrogen chloride and air were metered directly through a rotameter while 75 percent steam or 5 percent sulfur trioxide were fed by metering nitrogen or air through a thermostated flask containing water at 90° C. or fuming sulfuric acid at 50° C., respectively. Product chlorine and unreacted hydrogen chloride were measured by absorption in potassium iodide solution followed by titration with standard thiosulfate and sodium hydroxide solutions. Effluent water vapor was condensed in a cold trap. Sulfur trioxide was determined by absorption in water followed by ion chromatography (of condensate plus absorber solution) to distinguish resulting sulfate from chloride. An oxygen monitor at the end of the analysis train confirmed that oxygen was indeed consumed during the air regeneration stages.

Four complete cycles of chlorine production and oxidant regeneration were performed. The first cycle demonstrated an isothermal, three stage embodiment of the invention. The second cycle omitted the steam strip stage. The third and fourth cycles tested performance before and after the use of high temperature regeneration followed by the intermediate temperature $SO_3$ reabsorption stage (stage 4). The results are summarized in Table 1. Although substantial conversions of HCl to $Cl_2$ were achieved in all cases, excessive losses during regeneration depressed yield when the steam strip was not used. The four stage cycle gave the highest conversion and yield. Performance in the four stage embodiment was quite good even though the experimental apparatus was simple and conditions were not optimized. It should be clear that with minor modifications and optimization within the scope of the present invention, commercially attractive conversions and yields are possible with both the three stage and four stage embodiments.

TABLE 1
SUMMARY OF EXPERIMENTAL RESULTS

| CYCLE NO: | 1 | 2 | 3 | 4 |
|---|---|---|---|---|
| STAGE 1 (HCl oxidation): | | | | |
| Temperature (°C.) | 430 | 430 | 430 | 430 |
| HCl fed (millimoles) | 45 | 37 | 37 | 39 |
| Cl$_2$ produced (millimoles) | 13 | 8 | 8 | 13 |
| HCl recovered (millimoles) | 2 | 4 | 3 | 3 |
| Conversion (2 × CL$_{2\ out}$/HCl$_{in}$, %) | 58 | 45 | 45 | 68 |
| STAGE 2 (steam strip): | | | | |
| Temperature (°C.) | 430 | not used | 430 | 475 |
| Cl$_2$ recovered (millimoles) | 0.3 | used | 1 | 0.7 |
| HCl recovered (millimoles) | 0.6 | — | 2 | 5 |
| Yield (2 × Cl$_2$ + HCl$_{out}$/HCl$_{in}$, %) | 65 | 45 | 66 | 93 |
| STAGE 3 (air regeneration) | | | | |
| Temperature (°C.) | 430 | 430–540 | 580 | 475 |
| Cl$_2$ lost (millimoles) | 0 | 0.9 | — | — |
| HCl lost (millimoles) | 0.2 | 5 | 3 | 1 |
| SO$_3$ evolved (millimoles) | <0.1 | 1.1 | 7.9 | 0.1 |
| STAGE 4 (SO$_3$ reabsorption): | | | | |
| Temperature (°C.) | not used | not used | 475 | not used |
| HCl lost (millimoles) | | | <0.1 | |
| SO$_3$ absorbed (millimoles) | — | — | 10.9 | — |

While particular embodiments of the invention have been shown and described, it will be obvious to those skilled in the art that various changes and modifications may be made without departing from the essential features of the present invention and, therefore, the aim in the appended claims is to cover all such changes and modifications as fall within the true spirit and scope of the invention.

I claim:

1. A process for generating an elemental halogen selected from chlorine, bromine or iodine, from a corresponding hydrogen halide comprising:
   a. absorbing a molten salt mixture comprised primarily of pyrosulfates, which includes a sulfate concentration of from 0 to 10 percent by weight and includes a dissolved oxygen compound capable of reacting with hydrogen halide to produce elemental halogen, into a porous inert substrate to produce a substrate-supported salt mixture;
   b. contacting a hydrogen halide in the substantial absence of an oxygen bearing gas with the substrate-supported salt mixture while maintaining said substrate-supported salt mixture during said contacting at an elevated temperature sufficient to sustain a reaction between said oxygen compound and said hydrogen halide to produce a gaseous elemental halogen effluent, substantially free of gaseous oxygen;
   c. purging the substrate-supported salt mixture at substantially the same temperature as in step b with steam, thereby recovering any unreacted hydrogen halide and elemental halogen effluent for recycle to step b;
   d. contacting said substrate-supported salt mixture at substantially the same or higher temperature as in step b but below that where significant quantities of SO$_3$ are stripped from the salt with a gas containing oxygen, whereby the dissolved oxygen compound in the substrate-supported salt mixture is regenerated by being oxidized to a higher valence state; and
   e. repeating steps b, c, and d.

2. The process according to claim 1 wherein during step (b) the substrate-supported salt mixture is maintained at a temperature of from 80° C. to 480° C.

3. The process according to claim 1 wherein the oxygen compound is V$_2$O$_5$.

4. The process according to claim 3 wherein the molten salt mixture further comprises 3 to 8 weight percent alkali metal sulfates and 50 to 90 weight percent pyrosulfates and 0–10 weight percent of a material selected from lithium sulfate or sulfuric acid; the dissolved oxygen compound comprises 13 to 18 weight percent V$_2$O$_5$; the salt in step b and c is maintained at 380° C. to 480° C.; and the contacting in step d is below 530° C.

5. The process according to claim 4 wherein the molten salt mixture further comprises 77 to 82 weight percent pyrosulfates; and the alkali metal sulfates further comprise a potassium/sodium ratio of 1:3 to 1:5;

6. The process according to claim 1 wherein the salt is a mixture of sodium sulfate, sodium pyrosulfate, potassium sulfate and potassium pyrosulfate as well as the oxygen compound.

7. The process according to claim 6 wherein the potassium and sodium are present in a potassium/sodium ratio of 1:3 to 1:5.

8. The process according to claim 7 wherein the molar ratio of sulfur to alkali metal is between 0.9 and 1.1.

9. The process according to claim 1 wherein the gas containing oxygen is oxygen or air.

10. The process according to claim 1 wherein liquid salt is circulated between three countercurrent contactors, stages 1, 2, and 3, with the stages having functions analogous to steps b, c, and d respectively.

11. A process for generating an elemental halogen selected from chlorine, bromine or iodine, from a corresponding hydrogen halide comprising:
   a. absorbing a molten salt mixture comprised primarily of pyrosulfates, which includes a sulfate concentration of from 0 to 10 percent by weight and includes a dissolved oxygen compound capable of reacting with hydrogen halide to produce elemental halogen, into a porous inert substrate to produce a substrate-supported salt mixture;
   b. contacting a hydrogen halide in the substantial absence of an oxygen bearing gas with the substrate-supported salt mixture while maintaining said substrate-supported salt mixture during said contacting at an elevated temperature sufficient to sustain a reaction between said oxygen compound and said hydrogen halide to produce a gaseous elemental halogen effluent, substantially free of gaseous oxygen;
   c. purging the substrate-supported salt mixture at substantially the same temperature as in step b with steam, thereby recovering any unreacted hydrogen halide and elemental halogen effluent for recycle to step b;
   d. contacting said substrate-supported salt mixture at a higher temperature than in step b with a gas containing oxygen, whereby the dissolved oxygen compound in the substrate-supported salt mixture is regenerated by being oxidized to a higher valence state;
   e. contacting the substrate-supported salt mixture, at a temperature less than the temperature in step d, but greater than the temperature of step b, with the SO$_x$ containing effluent of step d; and f. repeating steps b, c, d, and e.

12. The process according to claim 11 wherein during step e the substrate supported salt mixture is contacted at a temperature of from 430° C. to 530° C.

13. The process according to claim 11 wherein during step b the substrate-supported salt mixture is maintained at a temperature of from 275° C. to 580° C.

14. The process according to claim 11 wherein the dissolved oxygen compound is V$_2$O$_5$.

15. The process according to claim 14 wherein: The molten salt mixture comprises 3 to 8 weight percent alkali metal sulfates and 50 to 90 weight percent pyrosulfates and 0–10 weight percent of a material selected from lithium sulfate or sulfuric acid; the dissolved oxygen compound comprises 13 to 18 weight percent V$_2$O$_5$; the salt in step b and c is maintained at 400° C. to 475° C.; the temperature during step d is between 530° C. and 570° C. and the contacting in step e is below 530° C.

16. The process according to claim 15 wherein: The molten salt mixture comprises 77 to 82 weight percent pyrosulfates; and the alkali metal sulfates comprise a potassium/sodium ratio of 1:3 to 1:5.

17. The process according to claim 11 wherein the salt is a mixture of sodium sulfate, sodium pyrosulfate, potassium sulfate and potassium pyrosulfate as well as the dissolved oxygen compound.

18. The process according to claim 17 wherein the potassium and sodium are present in a potassium/sodium ratio of 1:3 to 1:5.

19. The process according to claim 11 wherein the molar ratio of sulfur to alkali metal is between 0.9 and 1.1.

20. The process according to claim 11 wherein liquid salt is circulated between three countercurrent contactors, stages 1, 2, and 3, with the stages having functions analogous to steps b, c, and d respectively.

* * * * *

UNITED STATES PATENT AND TRADEMARK OFFICE
CERTIFICATE OF CORRECTION

PATENT NO. : 5,084,264
DATED : January 28, 1992
INVENTOR(S) : Stephen E. Lyke

It is certified that error appears in the above—identified patent and that said Letters Patent is hereby corrected as shown below:

Column 3, line 15   between the word "temperature" and the parenthetical phrase "(stage 4)", delete the word --stage--.

Col. 3, line 46, replace the word "byproduct" with --by-product--.

Column 4, line 3   replace the word "Silica" with --silica--.

Column 5, line 22   between the words "are" and "by" insert the word --represented--.

Column 6, line 54   between the words "lithium," and "sodium" insert the word --or--.

Column 6, line 54   between the words "sodium" and "or" insert --,--.

Column 9, line 11   replace "CL" with --Cl--.

Column 10, line 2   replace "(b)" with --b--.

Column 10, line 3   replace "80°C" with --380°C--.

Signed and Sealed this

Thirteenth Day of July, 1993

Attest:

MICHAEL K. KIRK

*Attesting Officer*   Acting Commissioner of Patents and Trademarks